US008352126B2

(12) United States Patent  (10) Patent No.: US 8,352,126 B2
Blaise et al.  (45) Date of Patent: Jan. 8, 2013

(54) ASSISTANCE SYSTEM FOR DRIVING IN SLOPES FOR AUTOMOBILES

(75) Inventors: Philippe Blaise, Dampierre les Bois (FR); Emmanuel Charpin, Etupes (FR); Damien Joucgnoux, Mazieres de Touraine (FR)

(73) Assignees: Peugeot Citroen Automobiles SA, Velizy Villacoublay (FR); Robert Bosch GmbH, Stuttgart (DE)

( * ) Notice: Subject to any disclaimer, the term of this patent is extended or adjusted under 35 U.S.C. 154(b) by 696 days.

(21) Appl. No.: 12/532,996

(22) PCT Filed: Apr. 9, 2008

(86) PCT No.: PCT/FR2008/050627
§ 371 (c)(1), (2), (4) Date: Sep. 24, 2009

(87) PCT Pub. No.: WO2008/139118
PCT Pub. Date: Nov. 20, 2008

(65) Prior Publication Data
US 2010/0036564 A1  Feb. 11, 2010

(30) Foreign Application Priority Data
Apr. 12, 2007 (FR) ..................................... 07 54437

(51) Int. Cl.
B60W 30/18 (2006.01)
(52) U.S. Cl. ................................... 701/42; 70/45; 70/70
(58) Field of Classification Search .................. 701/42, 701/45, 70
See application file for complete search history.

(56) References Cited

U.S. PATENT DOCUMENTS

| 6,233,514 B1 | 5/2001 | Claussen et al. |
| 6,247,548 B1 * | 6/2001 | Hayashi et al. ............ 180/206.2 |
| 6,351,698 B1 * | 2/2002 | Kubota et al. ................... 701/51 |
| 6,374,173 B1 * | 4/2002 | Ehlbeck .......................... 701/93 |
| 6,577,334 B1 * | 6/2003 | Kawai et al. .................. 348/148 |
| 2006/0220455 A1 | 10/2006 | Schmidt et al. |
| 2007/0090691 A1 | 4/2007 | Maskell et al. |

FOREIGN PATENT DOCUMENTS

| DE | 10250179 A | 5/2004 |
| EP | 0979762 A | 2/2000 |
| EP | 1777133 A | 4/2007 |
| FR | 2850069 A | 7/2004 |
| WO | 01/14186 A | 3/2001 |

OTHER PUBLICATIONS

International Search Report of PCT Appl. No. PCT/FR2008/050627 mailed Oct. 22, 2008.

* cited by examiner

Primary Examiner — Yonel Beaulieu
(74) Attorney, Agent, or Firm — Nicolas E. Seckel

(57) ABSTRACT

The system of the invention includes sensors (11, 12, 13) for measuring physical values useful for driving assistance, a path correction electronic calculator (20) including a Hill Assist (HA) module for hill start assistance and a Hill Descent Control module for limiting the downhill speed, and actuators (31 to 35) controlled by said calculator for acting on the different driving parameters. The calculator further includes a Hill Assist Descent Control (HADC) for driveability control assistance in slopes, that enables or disables the Hill Assist (HA) and Hill Descent Control (HDC) modules based on specific control rules for managing intermediate life situations between the situations managed by the Hill Assist (HA) module and those managed by the Hill Descent Control (HDC) module. The invention also relates to automobiles and to automobile driving assistance systems.

16 Claims, 6 Drawing Sheets

Figure 1:
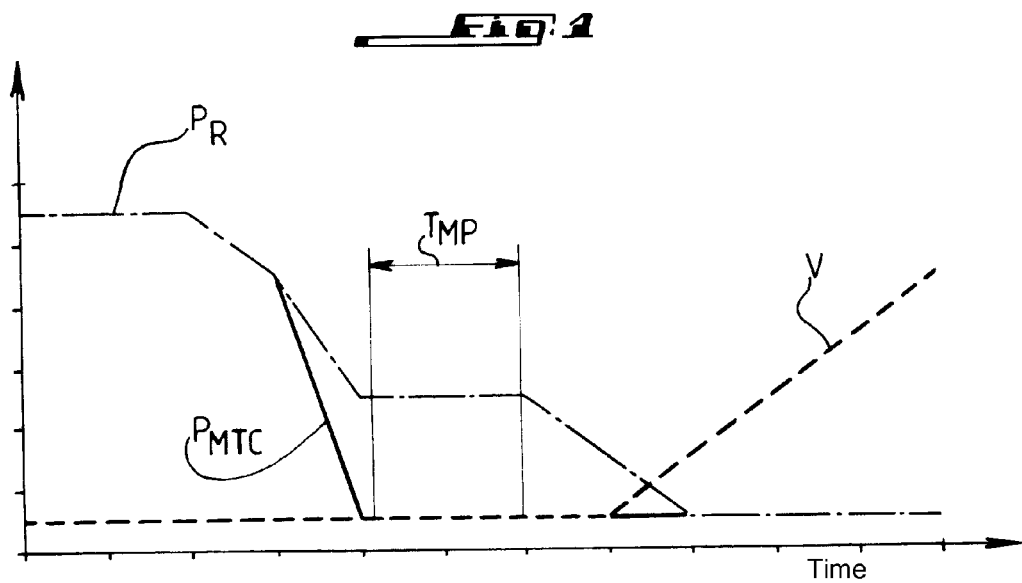

| Hill assist | Direction of motion intended by the driver | Description of operation | Present operation of the systems |
|---|---|---|---|
| (car uphill) | ↗ | 🔲 | Vehicle at a standstill on the slope |
| | | 🔲 | Maintaining the vehicle on the slope for a time X after release of the brake pedal or when the driver accelerates |
| (car uphill) | ↗ | 🔲 | Vehicle at a standstill on the slope |
| | | 🔲 | No maintaining of the vehicle on the slope, driver's intention is observed |
| (car downhill) | ↘ | 🔲 | Vehicle at a standstill on the slope |
| | | 🔲 | Maintaining the vehicle on the slope for a time X after release of the brake pedal or when the driver accelerates |
| (car downhill) | ↘ | 🔲 | Vehicle at a standstill on the slope |
| | | 🔲 | No maintaining of the vehicle on the slope, driver's intention is observed |

*Fig. 6*

| Hill assist | Direction of motion intended by the driver | Description of operation | Present operation of the systems |
|---|---|---|---|
|  | ↗ |  | Vehicle at a standstill on the slope |
| | |  | Maintaining the vehicle on the slope for a time X after release of the brake pedal or when the driver accelerates |
|  | ↘ |  | Vehicle at a standstill on the slope |
| | |  | No maintaining of the vehicle on the slope, driver's intention is observed |
|  | ↙ |  | Vehicle at a standstill on the slope |
| | | | Maintaining the vehicle on the slope for a time X after release of the brake pedal or when the driver accelerates |
| | ↗ | | Vehicle at a standstill on the slope |
| | | | No maintaining of the vehicle on the slope, driver's intention is observed |

Table I

FIG. 7

| HDC | Direction of motion intended by the driver | Description of operation | Present OFF ROAD operation of the systems | Service impact |
|---|---|---|---|---|
| (vehicle facing up, moving up) | ↗ | | Vehicle at a standstill on the slope | |
| (vehicle facing up, moving down) | ↙ | | No starting of the system | |
| (vehicle facing down, moving up) | ↖ | | Vehicle at a standstill on the slope | |
| | | | Starting of the system, when it will have attained a vehicle speed > set speed | Gain speed until the system detects vehicle speed > set speed and then braking action to slow down the vehicle |
| (vehicle facing down, moving down) | ↘ | | Vehicle at a standstill on the slope | |
| | | | No starting of the system | |
| | | | Vehicle at a standstill on the slope | |
| | | | Starting of the system, when it will have attained a vehicle speed > set speed | Gain speed until the system detects vehicle speed > set speed and then braking action to slow down the vehicle |

Table II

Fig. 8

| HDAC | Direction of motion intended by the driver | Description of operation | HADC operation in an OFF ROAD situation on low and medium adherence | Service impact |
|---|---|---|---|---|
| 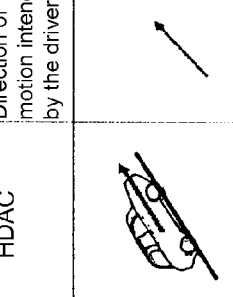 | ↗ |  | Vehicle at a standstill on the slope | |
| 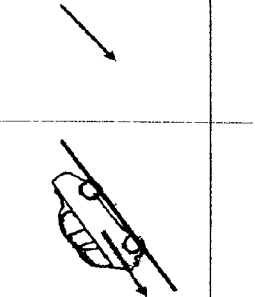 | ↘ |  | Maintaining the vehicle on the slope for a time X after release of the brake pedal or when the driver accelerates | Allow a change of gear in the the case of maneuvering on a slope. Give time to the driver for placing his/her wheels on the right trajectory in the OFF ROAD sectors for trialling and on low or medium adherence. |
| 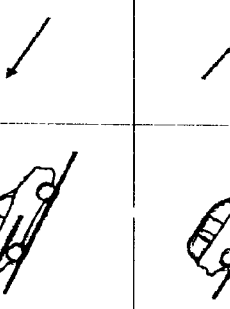 | ↙ |  | Vehicle at a standstill on the slope | |
| | | 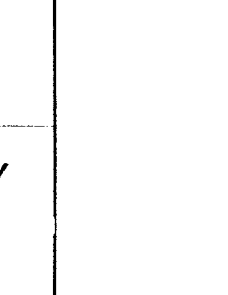 | Maintaining the vehicle on the slope for a time X after release of the brake pedal and pressure loss for accompanying the vehicle until the starting of the HDC (Hill Descent Control) | Gaining of speed controlled by the pressure gradient of the Hill Assist function until the system detects vehicle speed >= set speed in order to have braking actions for slowing the vehicle down to the set speed |
|  | ↙ | | Vehicle at a standstill on the slope | |
| | | | Maintaining the vehicle on the slope for a time X after release of the brake pedal or when the driver accelerates | Allow a change of gear in the the case of maneuvering on a slope. Give time to the driver for placing his/her wheels on the right trajectory in the OFF ROAD sectors for trialling and on low or medium adherence. |
| | ↗ | | Vehicle at a standstill on the slope | |
| | | | Maintaining the vehicle on the slope for a time X after release of the brake pedal and pressure loss for accompanying the vehicle until the starting of the HDC (Hill Descent Control) | Gaining of speed controlled by the pressure gradient of the Hill Assist function until the system detects vehicle speed >= set speed in order to have braking actions for slowing the vehicle down to the set speed |

Table III

ASSISTANCE SYSTEM FOR DRIVING IN SLOPES FOR AUTOMOBILES

The present invention relates to an assistance system for driving in slopes for automobiles.

Through the efforts of automobile makers and equipment suppliers, it has been possible to produce still more performing electronic systems as regards assistance with driving a vehicle in different life situations, in particular on uphill and downhill slopes.

For example, the assistance system for uphill starting, also known under the name of a <<Hill Assist >>, is known, which maintains immobilization of the vehicle (brakes on) upon release of the brake pedal and for a short instant, giving the driver time for switching from the brake pedal to the accelerator pedal. This function is only enabled when the vehicle has been completely immobilized, foot on the brake pedal, and starting from a certain inclination of the slope.

The system for limiting downhill speed is also known—also called <<Hill Descent Control>> system, —which automatically applies the brakes of the vehicle when moving downhill. It allows the speed of the vehicle to be maintained constant in a strongly inclined slope. It works both in forward gear and in reverse gear. It provides control of the speed of each of the wheels while seeking maximum adherence. This is also a component for assisting with driving uphill.

Other systems are known from the state of the art. Thus, for example, document FR 2 850 069 describes a brake control system during phases for stopping and setting into motion a motor vehicle equipped with decoupled braking, which comprises at least one sensor measuring the force applied to the wheels of the vehicle, a sensor for sensing the slope of the environment, means for measuring the braking request from the driver, an electronic control unit, means for computing the braking set value in order to maintain the vehicle at a standstill regardless of the slope of the environment, means for calculating the braking set value during an uphill start desired by the driver, means for calculating the braking set value during downhill starting desired by the driver, and means for calculating the braking set value limiting acceleration of the vehicle, during maneuvers on a slope, possibly with the engine decoupled from the transmission. The electronic control unit is capable of enabling each of said means for calculating the braking set value either successively or independently of each other.

The object of the present invention is to provide a assistance system for driving in slopes, which will provide true assistance to drivers of vehicles, in particular of motor vehicles, during forward or reverse gear downhill motions in an <<Off Road>> situation or on a road whatever the adherence.

Another object of the present invention is to provide such a system, which enhances known systems of the prior art, such as those mentioned earlier as the hill starting assistance system or the downhill speed limitation system.

Another object of the present invention is to provide such as system which may be applied on any 4×4 vehicle (torque transmitted by the four wheels) or 4×2 vehicle (torque transmitted by the wheels or the rear wheels).

Finally, an object of the present invention is also to provide a complete assistance system for driving in slopes, which allows the different onboard modules of known systems (<<Hill Assist>> module and <<Hill Descent Control>> module) to communicate together in order to provide a much more advanced service in terms of active safety for the driver of the vehicle.

In order to achieve these objects, the present invention designs a novel assistance system for driving in slopes for automobiles, which comprises sensors for continuous measurement of physical quantities related to the movement of the vehicle, a path-correction electronic computer—or electronic stability program computer—integrating a <<Hill Assist>> module for uphill starting assistance—also designated as HA module in the following of the present text—and a <<Hill Descent Control >> module for limiting downhill speed—also designated as HDC module in the following of the present text, and actuators controlled by the ESP computer for acting on different driving parameters. The computer further comprises a <<Hill Assist Descent Control>> module for assisting with control of driveability in slopes—also designated as an HADC module in the following of the present text—which controls the entry into action and withdrawal of either one of said HA and HDC modules according to specific control rules for managing life situations intermediate between the situations managed by the HA module and the situations managed by the HDC module.

According to the preferred embodiment of the invention, the HADC module controls the gradual withdrawal of the operation of the HA module after an operating period of the latter longer than a predetermined period, and the vehicle then being in motion, orders the entry into action of the HDC module if the speed of the vehicle is higher than a predetermined speed so as to slow down the vehicle to this predetermined speed, called the set speed.

The HADC module receives continuous information from the computer for managing the engine of the vehicle.

The actuators preferably comprise the main brake hydraulic group of the vehicle, and the computer for managing the engine of the vehicle.

The so-called ESP computer further comprises the safety anti-lock regulator (anti-lock braking system (ABS)).

The sensors for measuring physical quantities related to the movement of the vehicle preferably comprise longitudinal and transverse acceleration sensors, a steering wheel angle sensor and a sensor of the speed of the vehicle.

The present invention also proposes a vehicle which is equipped with a path correcting system (ESP) in slopes according to the one described above in its main lines.

This vehicle may be a motor vehicle with four driving wheels, or else a motor vehicle with two forward and backward driving wheels.

Figure 2:
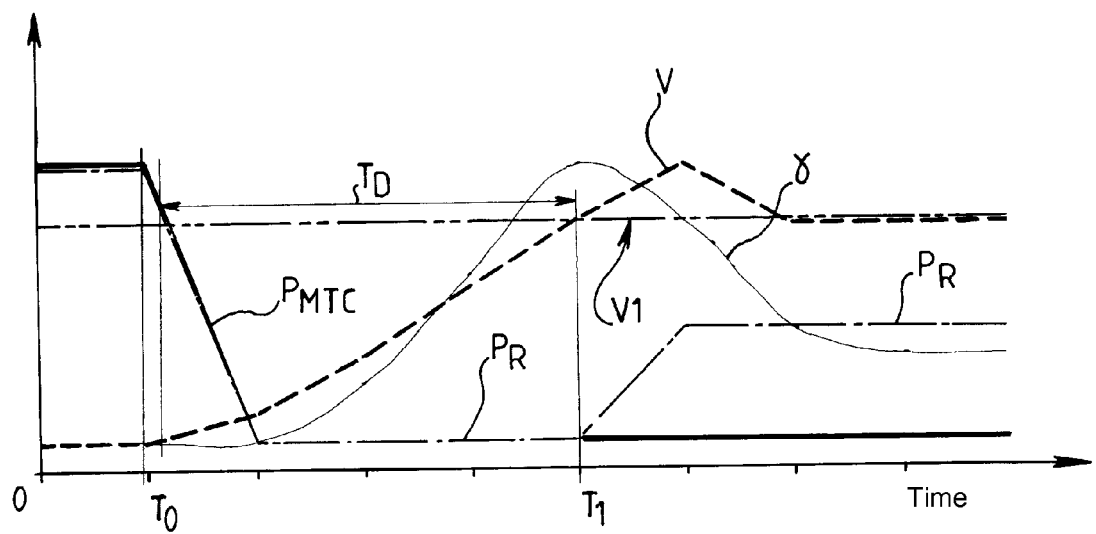
Figure 3:
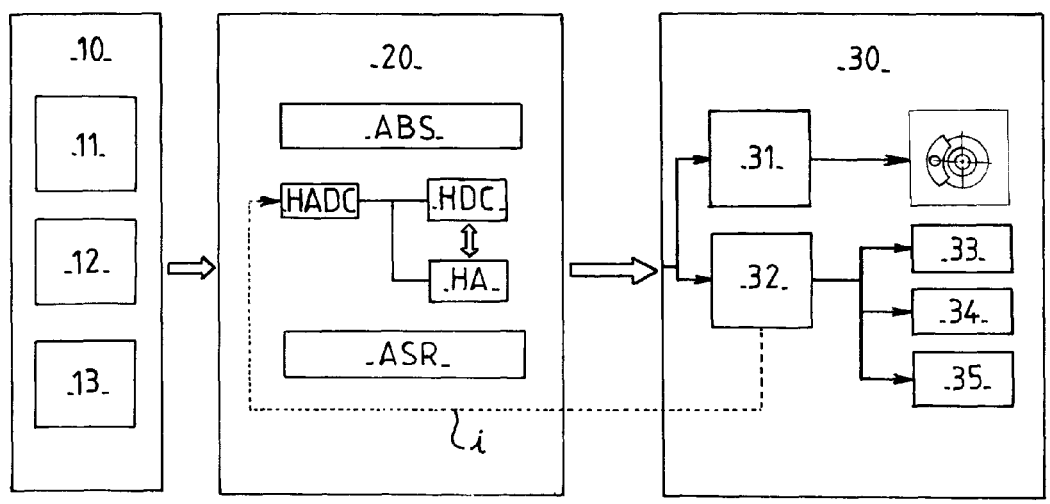
Figure 5:
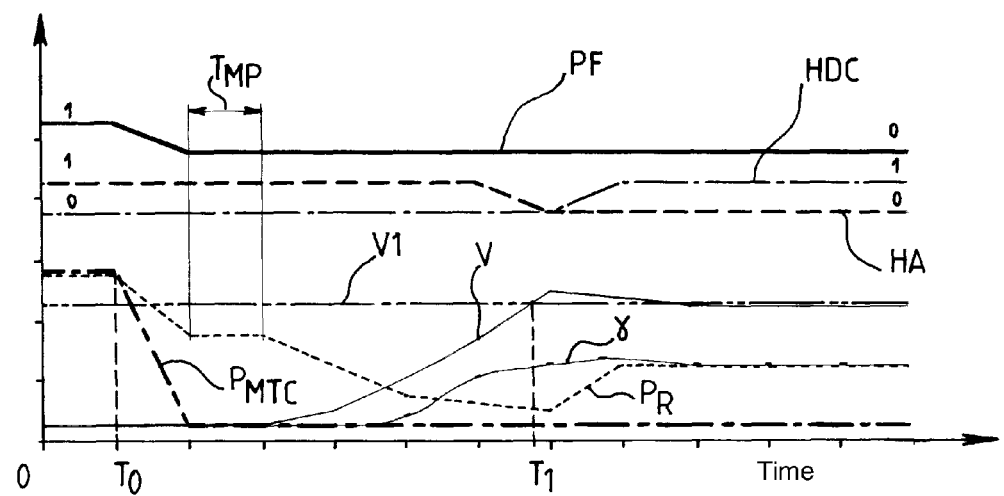
Figure 4:
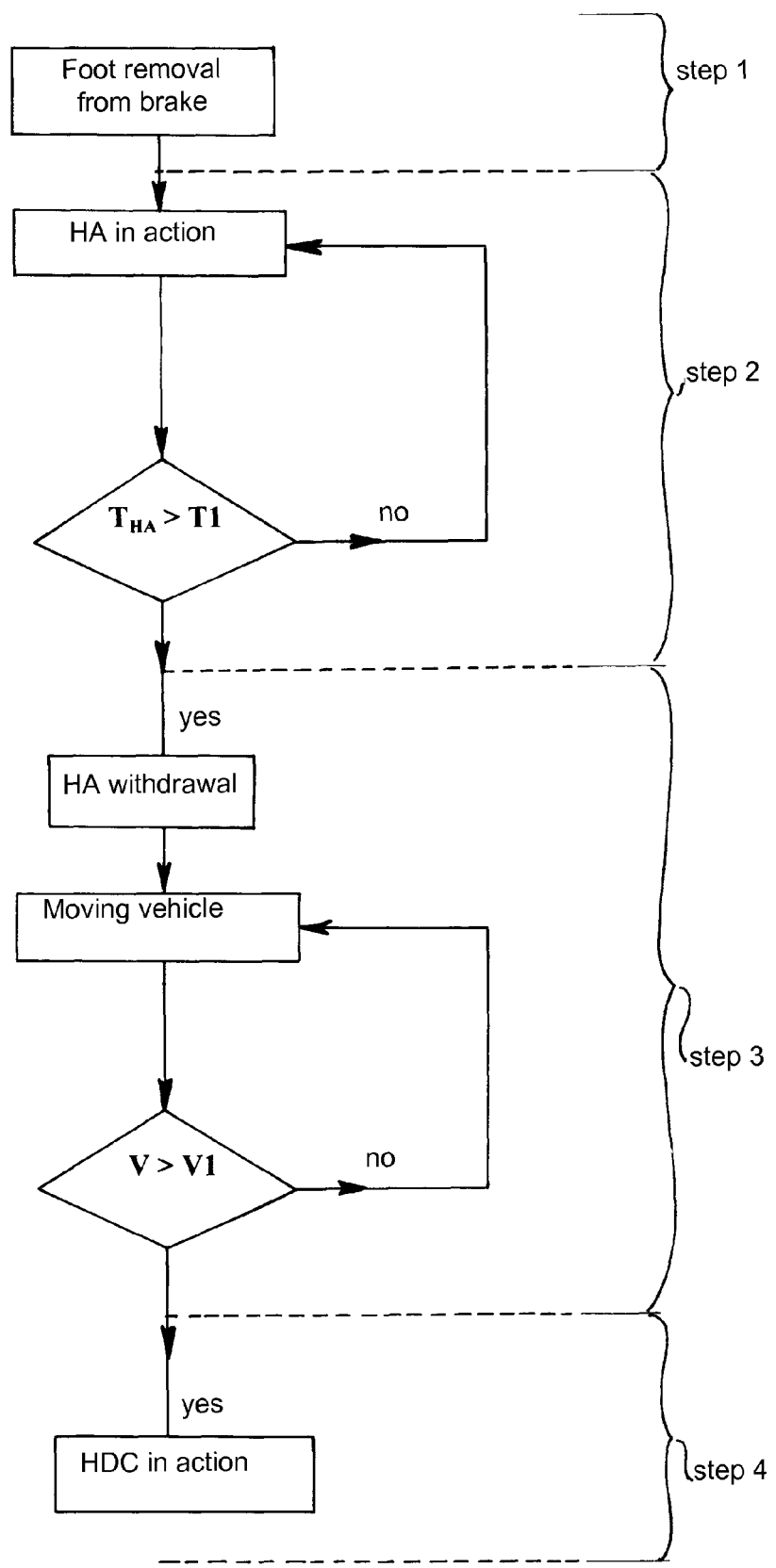

Other objects, advantages and features of the invention will become apparent in the following description of a non-limiting preferred embodiment of the object, and of the scope of the present patent application, accompanied by drawings wherein:

FIG. 1 is a graph illustrating an exemplary situation managed by the <<Hill Assist>> system for assisting with only uphill starting—referenced as HA in the drawings and also designated by <<HA system>> in the following of the present text, FIG. 2 is a graph illustrating an exemplary situation managed by the <<Hill Descent Control>> system for only limiting downhill speed—referenced as HDC in the drawings and also designated by "HDC system" in the following of the present text, FIG. 3 is a block diagram of the architecture of the assistance system for driving in slopes, according to the present invention, FIG. 4 is a functional flowchart of the logic of the system of the present invention, FIG. 5 is a graph illustrating an exemplary situation managed by the system according to the present invention, FIG. 6 is a Table I for describing the operation of a <<Hill Assist>> system, FIG. 7 is a Table II for describing the operation of a <<Hill Descent Control>> system, and FIG. 8 is a Table III for describing the operation of an HADC system according to the present invention.

As mentioned earlier, the HA system for assisting with uphill starting maintains the vehicle on the slope at a standstill in position for a certain time if the driver does not accelerate when the direction of motion intended by the driver is opposite to the direction of movement which the vehicle would take if its brakes were not on. The function of the HA system is to provide aid and assistance during uphill starting. When the direction of motion intended by the driver is the same as the one given to the vehicle by the slope, there is no maintaining of the vehicle on the slope, the HA system does not intervene: everything occurs as if the intention of the driver was observed.

The operation of the HA system may be summarized in the following way, in the Table of FIG. 6.

The graph of FIG. 1 illustrates this operation, in a situation in which the vehicle is on an uphill slope and the intention of the driver is to move in forward gear, or else in a situation in which the vehicle is on a downhill slope and the intention of the driver is to start in reverse gear. Upon releasing the brake pedal, the pressure on the master cylinder $P_{MTC}$ of the braking system (illustrated with a solid line) falls back to zero, while the braking pressure on the wheels $P_R$ (illustrated in mixed dashed lines) is maintained for a time $T_{MP}$ before motion of the vehicle resumes, this resumption being illustrated by the curve V representative of the speed of the vehicle in short dashed lines.

The function of the HDC system for limiting downhill speed is different. The HDC system maintains, during off-road movement of the vehicle, the speed of the vehicle to a constant value, in an uphill or downhill slope while observing the direction of motion of the vehicle (see drawing Table 2: indeed if there is an uphill slope and an intention of moving in reverse gear then HDC is enabled) by taking into account the intention of the driver, when the engine brake no longer allows this.

When the direction of motion intended by the driver is the same as the one given to the vehicle by the sole slope, the HDC system intervenes, unlike the system HA which does not intervene. This intervention consists of setting the speed V of the vehicle to a predetermined set speed V1. When the direction of motion intended by the driver is opposite to the one given by the vehicle by the sole slope, unlike the HA system which intervenes in this case, the HDC system as for it does not intervene (this is true except in the case when the clutch is not engaged).

The operation of the HDC system may be summarized in the following way, in Table II of FIG. 6.

The graph of FIG. 2 illustrates this operation, in a situation where the vehicle is on a uphill slope and the intention of the driver is to move in reverse gear, or else vice versa in a situation where the vehicle is on a downhill slope and the intention of the driver is to move in forward gear. Upon releasing the brake pedal, the pressure of the master cylinder $P_{MTC}$ (illustrated with a solid line) again falls to zero, the braking pressure on the wheels $P_R$ (illustrated in mixed dashed lines) also. When the speed V of the vehicle (illustrated in short dashed lines) reaches a predetermined set value V1, the HDC system will block the speed V on this set value with an adaptation time. The set speed V1 is maintained by the action of braking pressure on the wheels $P_R$ from time $T_1$. The speed V starts from the value 0 at time $T_0$ (vehicle at a standstill) in order to reach V1 (set value of the HDC system) because of the acceleration γ of the vehicle.

The time $T_D$ represents the time for starting the HDC system during which there is no assistance to the driver; this is the time required so that the speed V of the vehicle reaches the set value V1.

The system of the present invention is a system for assisting in the control of driveability in slopes, also a so-called <<Hill Assist Descent Control>> which is described hereafter with reference to the block diagram of FIG. 3.

Reference 10 designates a set of continuous measurement sensors which provide input values to an ESP type module referenced as 20, said module 20 after treating said input values feeds actuators designated under the general reference of 30.

The set of sensors comprises, as a non-limiting example of the object of the invention, means for measuring the longitudinal and transverse acceleration of the vehicle, for example the three-axis accelerometer, referenced as 11, a sensor for measuring the angle of the steering wheel 12 and a sensor for measuring the speed 13 of the vehicle.

Reference 20 designates the computer of the ESP system, also called electronic path-correcting computer. The ESP system (ESP is the acronym of Electronic Stability Program) is an assistance system for driving which provides dynamic safety. Sensors installed on each wheel detect losses of adherence and transmit them to the ESP computer of the type of the one referenced as 20 in FIG. 3. It compares them with the position of the steering wheel and with the speed of the vehicle. If it detects an abnormality, the ESP system will automatically accelerate or brake the wheel having an abnormality, in order to give back adherence to the vehicle and to put it back on a good path.

The computer 20 includes the following modules:
- a module for controlling the electronic safety system which, if necessary, prevents blocking of the wheels upon braking—or ABS system (acronym for Antilock Brake System) referenced as such in FIG. 3.
- a module for controlling the electronic system with which it is possible to reduce or possibly suppress skidding of the driving wheels by acting on the brakes and possibly on engine management—or ASR (acronym for Anti Split Regulation) system, referenced as such in FIG. 3.
- a module HDC for limiting downhill speed,
- an HA module for assisting with uphill starting, and
- a module for assisting with driveability control in slopes, or a <<Hill Assist Descent Control>> referenced as HADC in the appended figures and designated as HADC module in the following of the present text.

The set of actuators 30 includes the hydraulic group 31 of the braking circuit and the engine management computer 32 which may control adjustment of ignition 33, adjustment of fuel injection 34 or adjustment of the throttle valve 35.

The HADC module of the present invention is a module which allows mutual communication between the modules of the uphill starting assistance systems HA and of the downhill speed limitation systems HDC. This new module HADC controls the entry into action and withdrawal of either one or both of the uphill starting assistance HA and downhill speed limitation HDC modules according to specific control rules for managing intermediate "life situations" between the situations managed by the uphill starting assistance module HA and the situations managed by the downhill speed limitation module HDC.

The intervention of the HADC module is illustrated on the diagram of FIG. 3 by the information loop "i" and the output of the HADC module connected to the input of the HA and HDC modules.

The function of the HADC module is illustrated by the functional flowchart of FIG. 4. The operating steps of the systems of the present invention are the following:

step 1: the driver removes his/her foot from the brake,
step 2: the HA system is actuated: it ensures that the vehicle is held on the slope for a time $T_{HA}$, and a comparison of this time $T_{HA}$ is made with a predetermined time T1,
if $T_{HA}$>T1, then the HADC system switches to the next step,
step 3: the HADC system controls the output of the HA system, this output having the result of causing the vehicle to move at a speed V, and compares the speed V of the vehicle with a predetermined set value V1,
step 4: as soon as this speed V reaches the set speed V1, the HADC system orders actuation of the HDC system for limiting the downhill speed.

The graph of FIG. 5 illustrates this operation, in a situation for example where the vehicle is on a downhill slope and the intention of the driver is to move in forward gear. At the time $T_0$ of release of the brake pedal (curve PF at zero level), the pressure on the master cylinder $P_{MTC}$ again falls to zero, while the braking pressure on the wheels $P_R$ is maintained for a time $T_{MP}$ before resumption of the movement of the vehicle, illustrated by the curve V representative of the speed of the vehicle under the effect of the given acceleration γ. This is the conventional operation of the HA system, as discussed earlier, illustrated by the curve in short dashed lines at two positions 0 and 1 in which the output position 0 of the HA system coincides with the time T1. When the speed V of the vehicle reaches the set value V1, the HDC system is actuated by the HADC system of the invention. The HDC system is illustrated by the curve in mixed dashed lines in two positions 0 and 1 in which the position 1 of entry into action coincides with the fact that the speed of the vehicle reaches the set speed V1. The HDC system will then block the speed V on this set value V1 under the conditions discussed earlier, with reference to FIG. 2.

Thus, there is a combination of the logics of both HA and HDC systems. With this combination, the driver of the vehicle may be assisted in critical situations. The HA system maintains the vehicle on the slope and then gradually releases the brakes so that the vehicle gains sufficient speed for entering HDC assistance. There is no longer any sensation of acceleration between the operation of both assistance systems.

The present invention therefore proposes a novel system which assists the driver of the motor vehicle, starting from known systems for uphill starting assistance (<<Hill Assist>>) and of downhill speed limitation (<<Hill Descent Control>>).

Upon starting in forward gear and on an uphill slope (uphill starting) or else upon starting in reverse gear and on a downhill slope (the HAD <<Hill Assist>> is always enabled whichever the direction of the slope and the intention of the driver), the vehicle is held for a predetermined time after releasing the brakes or when the driver accelerates, and the system of the invention allows changing of gears, gives time to the driver for placing the wheels of the vehicle on the right path in the off-road sectors and on medium or low adherence.

Upon starting in reverse gear on a downhill slope or else upon starting in forward gear on a downhill slope, the vehicle is maintained on the slope during a predetermined time after release of the brake pedal, and the system of the invention controls the gain in speed by the pressure gradient of the <<Hill Assist>> function until it detects that the speed of the vehicle has reached the set value and, this speed having been reached, it blocks the speed of the vehicle on the set speed by applying pressure on the brakes.

This may be summarized in the following way in Table III of FIG. 8.

The assistance system for driveability control on slopes according to the present invention is a system of simple design, easy-to-integrate, reliable and economical, because it is based on existing systems, and essentially only requires adaptations in terms of software packages.

It provides comfort and safety to the driver of the vehicle in the situations described above.

Of course, the present invention is not limited to the described embodiment and illustrated above as an example; other embodiments may be designed by one skilled in the art without departing from the framework and scope of the present invention.

The invention claimed is:

1. An assistance system for driving a motor vehicle in slopes, wherein the system comprises
    sensors for continuous measurements of physical quantities related to the movement of the vehicle,
    an electronic path-correcting computer named ESP computer integrating a hill assist module for uphill starting assistance and a hill descent control module for limiting downhill speed, and
    actuators controlled by the ESP computer in order to act on different driving parameters of the vehicle,
    wherein the computer further integrates a hill assist descent control module for assistance with control of driveability in slopes which orders the entry into action and withdrawal of either one of said hill assist and hill descent control modules for handling intermediate life situations of the vehicle between situations managed by the hill assist module and those managed by the hill descent control module,
    wherein the hill assist descent control module controls (i) when the vehicle is starting on an uphill slope and when the vehicle is starting on a downhill slope, entry into action of the hill assist module for starting assistance, (ii) gradual withdrawal from operation of the hill assist module after an operating time of the hill assist module longer than a predetermined duration, and (iii) the vehicle then being in movement, entry into action of the hill descent control module if the speed of the vehicle is higher than a predetermined speed on a downhill slope, so as to slow down the vehicle to this predetermined speed.

2. The system according to claim 1, wherein the hill assist descent control module receives continuous information from the engine management computer of the vehicle.

3. The system according to claim 1, wherein the actuators comprise the main brake hydraulic group of the vehicle and the engine management computer.

4. The system according to claim 1, wherein the ESP computer further comprises the safety anti-blocking regulator.

5. The system according to claim 1, wherein the sensors for measuring physical quantities related to the movement of the vehicle comprise longitudinal and transverse acceleration sensors, a steering wheel angle sensor and a speed sensor of the vehicle.

6. A vehicle equipped with a system according to claim 1.

7. The vehicle according to claim 6, which is a motor vehicle with four driving wheels.

8. The vehicle according to claim 6, which is a motor vehicle with two driving wheels at the front or at the rear.

9. The system according to claim 2, wherein the actuators comprise the main brake hydraulic group of the vehicle and the engine management computer.

10. The system according to claim 2, wherein the actuators comprise the main brake hydraulic group of the vehicle and the engine management computer.

11. The system according to claim 2, wherein the ESP computer further comprises the safety anti-blocking regulator.

12. The system according to claim 3, wherein the ESP computer further comprises the safety anti-blocking regulator.

13. The system according to claim 2, wherein the ESP computer further comprises the safety anti-blocking regulator.

14. The system according to claim 1, wherein the ESP computer further comprises the safety anti-blocking regulator.

15. The system according to claim 9, wherein the ESP computer further comprises the safety anti-blocking regulator.

16. The system according to claim 10, wherein the ESP computer further comprises the safety anti-blocking regulator.

* * * * *